3,309,381
VINYL THIOPHENE PRODUCTION
Charles R. Adams, Oakland, Calif., assignor to Shell Oil
Company, New York, N.Y., a corporation of Delaware
No Drawing. Filed Nov. 27, 1963, Ser. No. 326,386
7 Claims. (Cl. 260—329)

This invention relates to the production of heterocyclic sulfur compounds and more particularly relates to a process for the production of 3-vinyl thiophene and its homologs.

Vinyl thiophene, because of its structure and properties, has been found to be an excellent substitute for styrene in many important fields of application. Vinyl thiophene is also useful as a starting material in the production of biologically soft detergents. It is a valuable plasticizer for rubber that is normally difficult to vulcanize. However, many of the methods available heretofore for its production are often unsuitable due to the unavoidable production of relatively large amounts of undesirable by-products and low yields of vinyl thiophene.

It is the object of this invention to provide an improved process whereby 3-vinyl thiophene and its homologs may be prepared more efficiently by catalytically reacting certain hydrocarbons with a sulfur oxide at relatively high temperatures.

In accordance with the invention 3-vinyl thiophene is produced by reacting a hydrocarbon with a sulfur oxide, in the presence of a metal phosphate catalyst, at a temperature in excess of about 400° C.

The hydrocarbons that are suitable for the preparation of a 3-vinyl thiophene are paraffins and olefins having an aliphatic group of one or two carbon atoms substituted in the three position of an aliphatic hydrocarbon having five carbon atoms in a straight chain. Hydrocarbons having more than 5 carbon atoms in a straight chain are not suitable for this invention since large amounts of aromatics will be formed resulting in substantially no yield of thiophenes. Hydrocarbons containing less than 5 carbon atoms in a straight chain or having 5 carbon atoms in a straight chain with no 3-($C_1$–$C_2$) substituent will react according to the process of this invention to form products containing substantially no vinyl thiophene. Preferred hydrocarbons comprise pentanes and pentenes having a 3-substituted methyl, ethyl or vinyl group.

The type of hydrocarbons which are used in this process may be represented by the following formula:

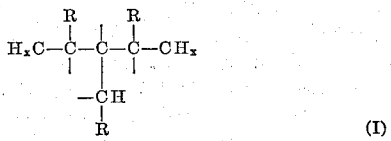

(I)

wherein R is $CH_x$ or H, and $x$ is 2 or 3. Each of the remaining unsatisfied carbon valences in the Formula I may be taken up by a hydrogen atom or by a double bond linkage to an adjacent carbon atom. Some specific examples of hydrocarbons which conform to the above description that may be used as the hydrocarbon charge are 3-methyl pentane, 3-methyl-1-pentene, 3-methyl-2-pentene, 3-ethyl pentane, 2,3-dimethyl pentane, 3-methyl-1,4-pentadiene, 3-ethyl-1-pentene, etc. The hydrocarbon charge need not necessarily consist of a single paraffin or olefin but may contain mixtures of two or more of the suitable hydrocarbons. The hydrocarbon may contain fluid materials other than the suitable hydrocarbon reactants capable of functioning as diluents and/or temperature or flow controlling means, etc. Materials which may be present in the hydrocarbon charge comprise gases and materials which are vapors under the reaction conditions, and which have no adverse effect upon the desired reaction, such as; for example, nitrogen, hydrogen, carbon dioxide and the like. The hydrocarbon charge may be obtained from any suitable source. It may be obtained, for example, by fractional distillation of hydrocarbon mixtures from natural sources or produced in catalytic or thermal refinery operations. Light gasoline fractions provide an excellent source of desirable starting material.

The sulfur oxide used to react with the specified hydrocarbon charge is preferably sulfur dioxide although sulfur trioxide may also be used. Normally these sulfur oxides are used in the free state but they may also be used in other combined states, for example as hydrates. The hydrates will decompose at reaction temperatures to release the sulfur oxide. The sulfur oxides may also be employed in the form of gaseous mixtures with other gases or vapors which do not substantially alter the reaction, such as, for example, oxygen, nitrogen, carbon dioxide, etc.

The production of a 3-vinyl thiophene in accordance with the process of this invention requires the use of a metal phosphate catalyst. Some specific examples of these catalysts which may be employed are calcium nickel phosphate, bismuth iron phosphate, bismuth phosphate, cobalt phosphate, indium phosphate, neodymium phosphate, iron phosphate, chromium phosphate, vanadium phosphate and calcium phosphate. The metal phosphates may be used alone or with a relatively inert support materials such as diatomaceous earth, alumina, silica gel, pumice, asbestos, or the like. The metal phosphate catalysts employed may be obtained from any suitable source. They may be prepared by adding a solution of the metal salt to a soluble phosphate solution which is maintained near neutral or the alkaline side. Alternatively an aqueous phosphoric acid and metal salt solution may be added to an aqueous solution of an alkali such as ammonium hydroxide. Suitable metal salts comprise for example chlorides, nitrates and acetates. Examples of suitable soluble phosphates are disodium phosphate, trisodium phosphate, dipotassium phosphate or di-ammonium phosphate. The resulting precipitate is washed, dried and pelleted.

The process for preparing a 3-vinyl thiophene according to this invention requires temperatures in the reaction zone in excess of about 400° C., up to for example about 600° C., and preferably between about 450° C., and about 575° C. It is essential that these temperatures be maintained throughout the course of the reaction between the hydrocarbon charge and sulfur oxide in the presence of the catalyst. Process reaction temperatures below 400° C. decreases the reaction rate so as to be impractical. Temperatures substantially in excess of about 600° C. will result in the thermal cracking of the hydrocarbon charge material resulting in the formation of undesirable products. Any suitable means for maintaining the reaction zone at the desired temperature range may be used.

Pressures within the reaction zone are not critical and the process may be conducted at subatmospheric, atmospheric or superatmospheric pressures. The reaction proceeds well at atmospheric pressures.

The metal phosphate catalysts may be employed in a fixed bed or fluid bed type of operation, or they may be used as a suspension in a riser type reactor. Since the reaction is endothermic the more complex fluid bed catalyst technique often used in exothermic reaction processes is not necessarily favored.

The process of this invention may be conducted in any suitable reaction vessel which has been provided with a means for allowing efficient entry of the reactants and a means for removing the product material. The hydrocarbon starting material and the sulfur oxide may be mixed together prior to their introduction into the reaction zone. When pre-mixing the starting materials it is preferred to convert the hydrocarbon charge to a gaseous form if necessary prior to mixing with the sulfur oxide. This mixture may be further heated up to reaction zone temperatures. The resulting mixture will then be introduced into the reaction zone at a single or plurality of points thereof. If desired, the hydrocarbon may be introduced into the reaction zone as a liquid. Since the reaction zone is maintained at a temperature above about 400° C., any hydrocarbon material within this zone and sulfur oxide separately introduced will provide a suitable gaseous reaction mixture within the reaction vessel.

During the reaction of sulfur oxide and hydrocarbon, the metal phosphate catalyst may become coated after prolonged period of use with a carbonaceous deposit which may adversely affect its catalytic activity. This deposit may be removed by any desired means. One convenient method of regenerating the phosphate catalyst to restore its activity is to introduce oxygen (air) into the reaction zone containing the catalyst at a temperature above about 400° C. which will cause the carbon material to be burned from the catalyst.

The reactor effluent is passed to suitable product recovery means. This may comprise, for example, a separation by condensation into a gaseous and a liquid phase, the latter containing the desired vinyl thiophene. The gaseous phase which will generally contain such materials as sulfur oxide, hydrogen sulfide, carbon dioxide, etc., may be eliminated or recycled.

To further illustrate the process of this invention the following specific examples are provided:

EXAMPLE I

A mixture of 3-methylpentane and sulfur dioxide in a molar ratio of hydrocarbon/$SO_2$ of 0.37 was passed over a calcium nickel phosphate catalyst at a temperature of 550° C. and at atmospheric pressure with a total gas hourly space velocity of 700 (volumes of gas at STP/volume of catalyst/hour. The $SO_2$ conversion was 47%; and 51% of the paraffin was reacted of which 41% was converted to 3-vinyl thiophene.

EXAMPLE II

A mixture of 3-methylpentane and sulfur dioxide in molar ratio of hydrocarbon/$SO_2$ of 0.34 was passed over a cobalt phosphate catalyst at a temperature of 500° C. and at atmospheric pressure with a total gas hourly space velocity of 210. The $SO_2$ conversion was 30%, while 38% of the paraffin was reacted of which 30% was converted to 3-vinyl thiophene.

EXAMPLE III

A mixture of 3-methyl-1-pentene and sulfur dioxide in a molar ratio of hydrocarbon/$SO_2$ of 0.36 was passed over a calcium nickel phosphate catalyst at 550° C. and atmospheric pressure with a total gas hourly space velocity of 250. The $SO_2$ conversion was 70%, with 95% of the olefin reacting of which 37% was converted to 3-vinyl thiophene.

EXAMPLE IV

A mixture of 3-methylpentane and sulfur dioxide in a molar ratio of hydrocarbon/$SO_2$ of 0.42 was passed over a bismuth phosphate catalyst at 500° C. with a total gas hourly space velocity of 230. The $SO_2$ conversion was 32%, and 33% of the paraffin was reacted of which 31% was converted to 3-vinyl thiophene.

EXAMPLE V

A mixture of 3-methylpentane and sulfur dioxide (molar ratio of hydrocarbon/$SO_2$ was 0.50) was passed over a calcium phosphate catalyst at a temperature of 540° C. and a total gas hourly space velocity of 930. $SO_2$ conversion was 65%, while 37% of the paraffin reacted of which 20% was converted to 3-vinyl thiophene.

EXAMPLE VI

A mixture of 3-methyl-1-pentene and sulfur dioxide was passed over a bismuth iron phosphate catalyst (molar ratio of hydrocarbon/$SO_2$ of 0.33) at a temperature of 550° C. and a total gas hourly space velocity of 290. $SO_2$ conversion was 58%, and 93% of the olefin was reacted of which 31% was converted to 3-vinyl thiophene.

EXAMPLE VII

A mixture of 3-methylpentane and sulfur dioxide in a molar ratio of hydrocarbon/$SO_2$ of 0.20 was passed over an indium phosphate catalyst at a temperature of 500° C. with a total gas hourly space velocity of 510. $SO_2$ conversion was 71%, and 68% of the paraffin was reacted of which 31% was converted to 3-vinyl thiophene.

EXAMPLE VIII

A mixture of 3-ethyl-1-pentene and sulfur dioxide in a molar ratio of hydrocarbon/$SO_2$ of 0.3 was passed over calcium nickel phosphate at a temperature of 550° C. at a total gas hourly space velocity of 4000. 47% of the olefin was reacted of which 18% was converted to 2-methyl-3-vinyl thiophene.

Similarly neodymium, iron, vanadium, chromium and bismuth phosphates were used to convert the paraffins and olefins to 3-vinyl thiophene according to the process of this invention.

In addition to conversion of the hydrocarbon materials to vinyl thiophene, among other products, substantial amounts of ethyl thiophene, olefins, diolefins and trienes corresponding to the starting hydrocarbon charges may be obtained. These products may be separated from the vinyl thiophene and recycled as the starting hydrocarbon charge material to be reacted with sulfur dioxide.

The sulfur dioxide used in the process of this invention undergoes a reduction during the catalytic reaction with the hydrocarbon material to form hydrogen sulfide along with water. The hydrogen sulfide can be separated and readily oxidized in a zone separate from the reaction zone by burning it in air to produce sulfur dioxide which may then be recycled to the process.

The relative proportions of hydrocarbon charge material and sulfur oxide are not found to be critical and may be varied at will to give the optimum vinyl thiophene yields depending on the particular catalyst used as well as changes in the gas hourly space velocity.

I claim as my invention:

1. A process for the production of a 3-vinyl thiophene which comprises reacting an aliphatic hydrocarbon selected from the group consisting of 3-methyl penetane, 3-methyl-1-pentene and 3-ethyl-1-pentene with sulfur dioxide in the presence of a metal phosphate catalyst at a temperature of from about 450° C. to about 600° C.

2. The process for the production of a 3-vinyl thiophene which comprises reacting an aliphatic hydrocarbon having a total of from six to nine carbon atoms in the molecule of the empirical formula

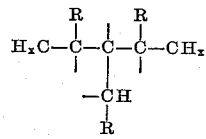

wherein R is $CH_x$ or H, $x$ is a whole number of from 2 to 3, and each of the remaining unsatisfied carbon valences in said formula is linked to a hydrogen atom or forms part of a double bond to the adjacent carbon atom, with sulfur dioxide, in the presence of a metal phosphate catalyst, at a temperature of from about 450° to about 600° C.

3. A process for the preparation of a 3-vinyl thiophene which comprises reacting an aliphatic hydrocarbon selected from the group consisting of 3-methyl pentane, 3-methyl- 1-pentene, and 3-ethyl-1-pentene, with sulfur dioxide in the presence of a metal phosphate catalyst selected from the group consisting of calcium nickel phosphate, bismuth iron phosphate, bismuth phosphate, cobalt phosphate, calcium phosphate, and indium phosphate at a temperature of from about 450° C. to about 600° C.

4. The process of claim 3 in which the catalyst is calcium nickel phosphate.

5. The process of claim 3 in which the catalyst is bismuth iron phosphate.

6. The process of claim 3 in which the catalyst is bismuth phosphate.

7. The process of claim 3 in which the catalyst is cobalt phosphate.

No references cited.

WALTER A. MODANCE, *Primary Examiner.*

CECILIA M. SHURKO, *Assistant Examiner.*